UNITED STATES PATENT OFFICE.

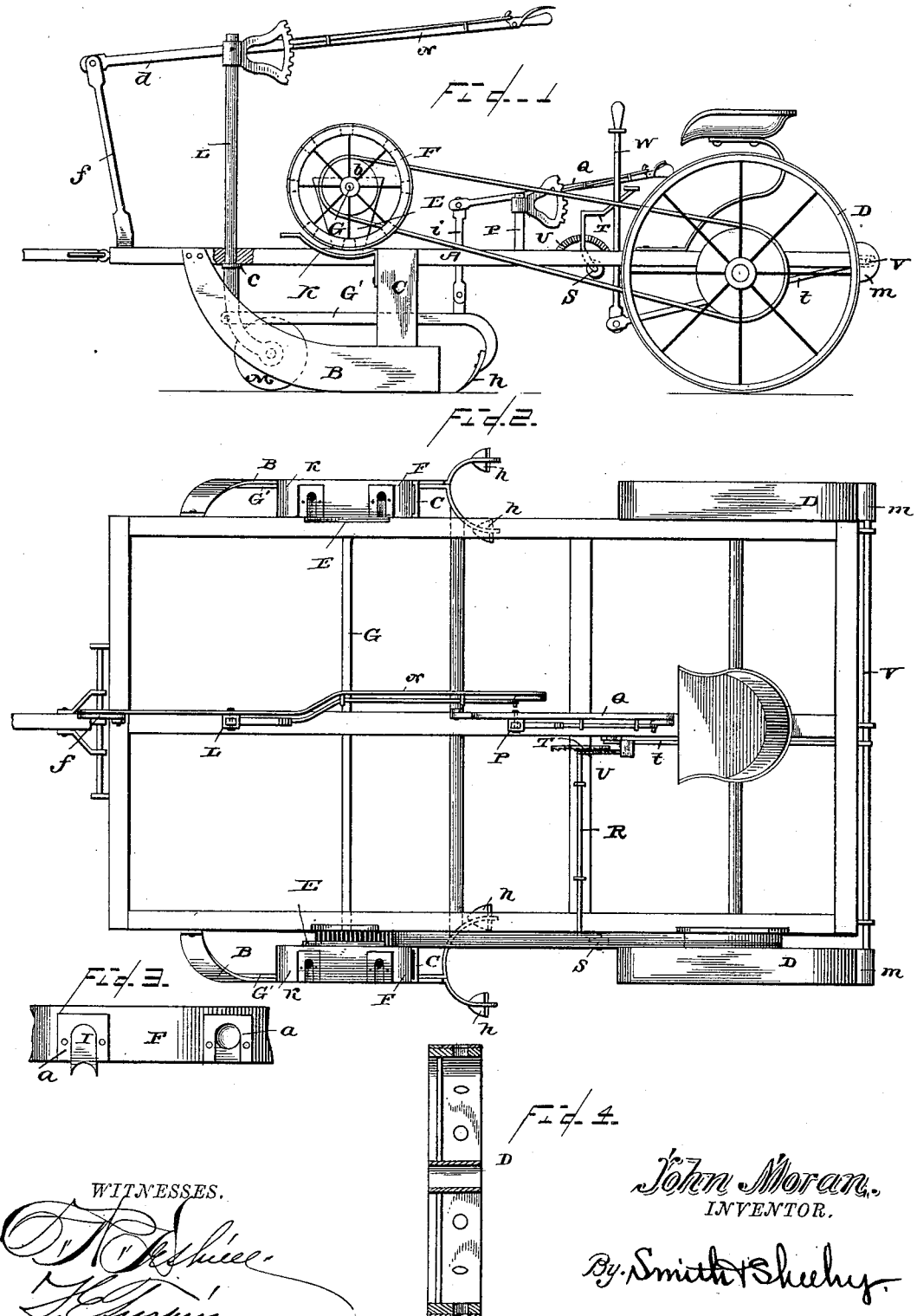

JOHN MORAN, OF ADAIR, MISSOURI.

CORN-PLANTER.

SPECIFICATION forming part of Letters Patent No. 386,207, dated July 17, 1888.

Application filed February 24, 1888. Serial No. 265,114. (No model.)

*To all whom it may concern:*

Be it known that I, JOHN MORAN, a citizen of the United States, residing at Adair, in the county of Adair and State of Missouri, have invented certain new and useful Improvements in Corn-Planters; and I do declare the following to be a full, clear, and exact description of the invention, such as will enable others skilled in the art to which it appertains to make and use the same.

This invention has relation to corn-planters, and the improvements will be fully understood from the following description and claim, when taken in connection with the accompanying drawings, in which—

Figure 1 is a side elevation of a corn-planter embodying my improvements, and Fig. 2 is a plan view of the same. Fig. 3 is a detail view of the seed-wheel. Fig. 4 is a sectional detail view of the said wheel.

Referring by letter to the said drawings, A indicates the main frame of the planter, which may be that of an ordinary corn-planter, and B indicates the furrow-openers, which may also be of the construction usually employed, having the vertical seed-dropping tube C. These furrow-openers serve to support the forward portion of the main frame, and the rear is supported by the drive-wheels D.

E indicates the hoppers or seed-boxes, which are arranged on the main frame, as shown, having the seed-throats or dropping-apertures in their under sides, which latter are adapted to have register with them holes in the seed-wheel during operation.

F indicates the seed-wheels, which are arranged on the opposite ends of a transverse shaft, G, and their perforated peripheries are designed to come directly beneath the hoppers, so as to receive the corn or grain to be planted. These seed-wheels have holes in their periphery arranged at an equal distance apart, so that the grain may be dropped in the furrow at uniform distances. The wheels are of a peculiar construction, having each hole faced with a metallic slotted plate, *a*, which serves as a guide for a slide-plate, I. The inner terminal of the slots in the plate *a* are rounded, and the slide-plate has one end rounded to conform thereto and its opposite end notched or cut out in a similar curvature. It will thus be seen that when it is desirable to plant grain of different sizes the slides may be regulated to form a cup accordingly, and in some cases, when it is desirable to drop grain at greater distances apart, a desired number of the slides—such as every alternate one—may be reversed and close the holes in the wheel entirely. The wheel may be made to drop at every quarter or half revolution. These wheels or their shafts, or at least one of the wheels, may be provided with a flanged fixed pulley, *b*, which is designed to receive an endless belt passing over a larger flanged pulley fixed to one of the rear supporting-wheels. This belt is designed to receive motion as the drive-wheels are rotated and impart such to the pulley *b* and the seed-wheels F.

Secured to the upper forward side of the drill-tube C is a curved plate, K, which extends around the forward portion of the periphery of the seed-wheels and in close proximity thereto. These guide-plates K are designed to retain the seed in the holes of the wheel as received from the hopper until they reach the point of discharge into the drill-tube.

L indicates a vertical shaft, which has fixed to its upper end a segmental rack, and on its lower end is journaled a caster-wheel, M. This shaft passes through the main frame and is collared, as shown at *e*, to support the same when raised, as will be presently explained.

N indicates a ratchet-lever, which is pivoted at a suitable point to the upper end of the vertical shaft L, and has its forward end extended, as shown at *d*, and is connected by means of a vertical link, *f*, to the forward portion of the main frame. It will thus be seen that in turning the machine during travel, by simply releasing the lever N from the teeth of the segmental rack and pressing upon the handle portion of the said lever, the forward portion of the frame may be raised, so as to clear the shoes or openers from the ground, thereby offering no obstruction to the machine.

G' G' indicate cultivator-beams, which are pivoted at their forward ends to the upwardly-curved portion of the furrow-openers, and their rear ends are branched and respectively provided with a cultivator or covering blades *h*. These coverers follow behind the drill-wheel, one on each side of the furrow, and throw the earth into the furrow upon the grain as it is dropped.

P indicates a short vertical standard, which is also secured to the main frame and provided with a segmental rack similar to that of the vertical shaft L. Pivoted to this vertical shaft is a ratchet lever, Q, which has its grasping end as well as the grasping end of the lever N arranged within convenient reach from the driver's seat, and the forward end of this lever Q, which extends beyond its fulcrum-point, is connected with the covering blades or shovels by means of a link, i. It will thus be seen that the said shovels may be conveniently raised from the soil by the operator when desired without leaving his seat.

R indicates a rock-shaft which has its bearing on a transverse beam of the main frame, and is provided at its outer end with a crank carrying a friction-roller, S. The object of this device is to tighten the belt by increasing its frictional contact with the pulleys of the seed-wheel and drive-wheel, respectively. The inner end of this rock-shaft is provided with an upwardly and rearwardly directed pedal-lever, T, which is arranged in such a position with relation to the driver's seat that he may conveniently place his foot upon the said lever to tighten the belt. The lever may be held in a convenient position by means of a suitable segmental rack, such as U.

Journaled in the rear transverse bar of the main frame is a brake-bar or scraper, V, having at opposite ends brake-shoes m.

W indicates a hand-lever, which is pivoted at a suitable point to the central longitudinal bar of the main frame, and its lower depending end is connected with the brake-bar by means of a rod, t. It will thus be seen that by manipulation of the lever W the brake may be applied to and removed from the drive-wheel.

Having described my invention, what I claim is—

The combination, with the main frame having the rear supporting and driving wheels, of the seed-dropping tubes having the extending guide-plates for the grain, the wheels F, journaled in suitable supports on the forward portion of the main frame and having the laterally-extended periphery provided with seed-dropping apertures, the hoppers arranged so as to have their discharge-apertures within the perforated periphery of the said wheels, the fixed pulleys, and endless guide-belt connecting the seed-dropping wheels with the main driving-wheels, substantially as specified.

In testimony whereof I affix my signature in presence of two witnesses.

JOHN MORAN.

Witnesses:
 JOHN W. JOHNSTON,
 N. F. MILLAN.